(12) United States Patent
Morin et al.

(10) Patent No.: US 10,375,880 B2
(45) Date of Patent: Aug. 13, 2019

(54) ROBOT LAWN MOWER BUMPER SYSTEM

(71) Applicant: iRobot Corporation, Bedford, MA (US)

(72) Inventors: Russell Walter Morin, Tewksbury, MA (US); Travis Pierce, Bedford, NH (US); Chris Bradley, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 192 days.

(21) Appl. No.: 15/395,865

(22) Filed: Dec. 30, 2016

(65) Prior Publication Data
US 2018/0184583 A1    Jul. 5, 2018

(51) Int. Cl.
*A01D 34/00* (2006.01)
*B25J 5/00* (2006.01)

(52) U.S. Cl.
CPC ............ *A01D 34/008* (2013.01); *B25J 5/007* (2013.01); *G05D 2201/0208* (2013.01)

(58) Field of Classification Search
CPC ............... A01D 34/008; A47L 2201/00; A47L 2201/04; B25J 5/007; G05D 2201/0208; G05D 2201/0203; G05D 2201/0211; G05D 2201/0214; G05D 2201/0215
See application file for complete search history.

(56) References Cited

U.S. PATENT DOCUMENTS

| | | | |
|---|---|---|---|
| 3,924,389 A | 12/1975 | Kita | |
| 3,946,543 A | 3/1976 | Templeton | |
| 4,133,404 A | 1/1979 | Griffin | |
| 4,163,273 A | 7/1979 | Wojtkowski et al. | |

(Continued)

FOREIGN PATENT DOCUMENTS

| | | |
|---|---|---|
| CN | 202243772 | 5/2012 |
| DE | 19932552 | 2/2000 |

(Continued)

OTHER PUBLICATIONS

Viking, "Robotic mowers", accessed Oct. 24, 2016, https://www.viking-garden.com/VIKING-products/Robotic-mowers/11508/Robotic-mowers.aspx (Year: 2016).*

(Continued)

*Primary Examiner* — Spencer D Patton
(74) *Attorney, Agent, or Firm* — Fish & Richardson P.C.

(57) ABSTRACT

In one aspect, a mobile robot includes a chassis, a shell moveably mounted on the chassis by a shell suspension system, and a sensor assembly configured to sense a distance and a direction of shell movement relative to the chassis. The sensor assembly includes a magnet disposed on an underside of the shell. The sensor assembly further includes three or more Hall effect sensors disposed on the chassis in a triangular pattern at fixed distances such that the three or more Hall effect sensors are positioned beneath the magnet when no force is applied to the shell, wherein relative motion between the magnet and the Hall effect sensors causes the sensors to produce differing output signals. The mobile robot also includes a controller configured to receive output signals from the Hall effect sensors and to determine a distance and a direction of movement of the shell relative to the chassis.

26 Claims, 11 Drawing Sheets

(56) References Cited

U.S. PATENT DOCUMENTS

| | | | |
|---|---|---|---|
| 4,545,453 A | 10/1985 | Yoshimura et al. | |
| 4,887,415 A | 12/1989 | Martin | |
| 4,909,024 A | 3/1990 | Jones et al. | |
| 5,204,814 A | 4/1993 | Noonan et al. | |
| 5,341,540 A | 8/1994 | Soupert et al. | |
| 5,438,721 A | 8/1995 | Pahno et al. | |
| 5,446,445 A | 8/1995 | Bloomfield | |
| 5,534,762 A | 7/1996 | Kim | |
| 5,537,711 A | 7/1996 | Tseng | |
| 6,049,745 A | 4/2000 | Douglas et al. | |
| 6,073,427 A | 6/2000 | Nichols | |
| 6,133,730 A | 10/2000 | Winn | |
| 6,140,146 A | 10/2000 | Brady et al. | |
| 6,166,706 A | 12/2000 | Gallagher et al. | |
| 6,339,735 B1 | 1/2002 | Peless et al. | |
| 6,493,613 B2 | 12/2002 | Peless et al. | |
| 6,553,612 B1 | 4/2003 | Dyson et al. | |
| 6,580,978 B1 | 6/2003 | McTamaney | |
| 6,605,156 B1 | 8/2003 | Clark et al. | |
| 6,625,843 B2 | 9/2003 | Kim et al. | |
| 6,671,592 B1 | 12/2003 | Bisset et al. | |
| 6,810,305 B2 | 10/2004 | Kirkpatrick, Jr. | |
| 6,841,963 B2 | 1/2005 | Song et al. | |
| 6,883,201 B2 | 4/2005 | Jones et al. | |
| 6,941,199 B1 * | 9/2005 | Bottomley | G05D 1/0221 318/587 |
| 6,999,850 B2 | 2/2006 | McDonald | |
| 7,203,576 B1 | 4/2007 | Wilson et al. | |
| 7,248,951 B2 | 7/2007 | Hulden | |
| 7,360,277 B2 | 4/2008 | Moshenrose et al. | |
| 7,389,166 B2 | 6/2008 | Harwig et al. | |
| 7,441,298 B2 | 10/2008 | Svendsen et al. | |
| 7,444,206 B2 | 10/2008 | Abramson et al. | |
| 7,474,941 B2 | 1/2009 | Kim et al. | |
| 7,503,096 B2 | 3/2009 | Lin | |
| 7,555,363 B2 | 6/2009 | Augenbraun et al. | |
| 7,571,511 B2 | 8/2009 | Jones et al. | |
| 7,578,020 B2 | 8/2009 | Jaworski et al. | |
| 7,603,744 B2 | 10/2009 | Reindle | |
| 7,617,557 B2 | 11/2009 | Reindle | |
| 7,620,476 B2 | 11/2009 | Morse et al. | |
| 7,636,982 B2 | 12/2009 | Jones et al. | |
| 7,784,139 B2 | 8/2010 | Sawalski et al. | |
| 7,849,555 B2 | 12/2010 | Hahm et al. | |
| 7,953,526 B2 | 5/2011 | Durkos et al. | |
| 8,239,992 B2 | 8/2012 | Schnittman et al. | |
| 8,347,444 B2 | 1/2013 | Schnittman et al. | |
| 8,370,985 B2 | 2/2013 | Schnittman et al. | |
| 8,392,021 B2 | 3/2013 | Konandreas et al. | |
| 8,584,305 B2 | 11/2013 | Won et al. | |
| 8,839,477 B2 | 9/2014 | Schnittman et al. | |
| 2001/0047321 A1 | 11/2001 | Peless et al. | |
| 2002/0160845 A1 | 10/2002 | Simonsen | |
| 2003/0023356 A1 | 1/2003 | Keable | |
| 2003/0055337 A1 | 3/2003 | Lin | |
| 2003/0120389 A1 | 6/2003 | Abramson et al. | |
| 2003/0182914 A1 | 10/2003 | Shibata et al. | |
| 2003/0234325 A1 | 12/2003 | Marino et al. | |
| 2004/0036618 A1 | 2/2004 | Ku et al. | |
| 2004/0187249 A1 | 9/2004 | Jones et al. | |
| 2004/0220000 A1 | 11/2004 | Falone et al. | |
| 2004/0244138 A1 | 12/2004 | Taylor et al. | |
| 2005/0007057 A1 | 1/2005 | Peless et al. | |
| 2005/0010331 A1 | 1/2005 | Taylor et al. | |
| 2005/0015914 A1 | 1/2005 | You et al. | |
| 2005/0020374 A1 | 1/2005 | Wang | |
| 2005/0021181 A1 | 1/2005 | Kim et al. | |
| 2005/0076466 A1 | 4/2005 | Yan | |
| 2005/0097952 A1 | 5/2005 | Steph et al. | |
| 2005/0108999 A1 | 5/2005 | Bucher | |
| 2005/0113990 A1 | 5/2005 | Peless et al. | |
| 2005/0217042 A1 | 10/2005 | Reindle | |
| 2005/0229340 A1 | 10/2005 | Sawalski et al. | |
| 2005/0278094 A1 | 12/2005 | Swinbanks et al. | |
| 2006/0020369 A1 | 1/2006 | Taylor et al. | |
| 2006/0064828 A1 | 3/2006 | Stein et al. | |
| 2006/0190133 A1 | 8/2006 | Konandreas et al. | |
| 2006/0196003 A1 | 9/2006 | Song et al. | |
| 2007/0006404 A1 | 1/2007 | Cheng et al. | |
| 2007/0016328 A1 | 1/2007 | Ziegler et al. | |
| 2007/0136981 A1 | 6/2007 | Dilger et al. | |
| 2007/0244610 A1 | 10/2007 | Ozick et al. | |
| 2008/0282494 A1 | 11/2008 | Won et al. | |
| 2010/0134104 A1 | 6/2010 | Riva et al. | |
| 2011/0121500 A1 | 5/2011 | Stanforth et al. | |
| 2014/0067124 A1 | 3/2014 | Williamson et al. | |
| 2014/0097835 A1 | 4/2014 | Sartee et al. | |
| 2015/0128364 A1 | 5/2015 | Dooley | |
| 2015/0160298 A1 | 6/2015 | Tabatowski-Bush | |
| 2015/0166060 A1 | 6/2015 | Smith | |
| 2016/0081526 A1 * | 3/2016 | Gottinger | A47L 11/4008 180/89.1 |
| 2016/0299503 A1 | 10/2016 | Wolfe et al. | |
| 2016/0354935 A1 | 12/2016 | Fay et al. | |
| 2017/0079499 A1 | 3/2017 | Schnittman et al. | |
| 2018/0107224 A1 * | 4/2018 | Bjorn | G05D 1/0227 |

FOREIGN PATENT DOCUMENTS

| | | |
|---|---|---|
| JP | H04320612 | 11/1992 |
| JP | 5799685 | 10/2015 |

OTHER PUBLICATIONS

Caracciolo et al., "Trajectory tracking control of a four-wheel differentially driven mobile robot." IEEE Int. Conf. Robotics and Automation, Detroit, MI, (1999) pp. 2632-2638.

Gomez et al., "A Three-Toe Biped Foot with Hall-Effect Sensing," Sep. 28, 2015; figures 2-3; p. 3, col. 2, last paragraph; p. 4; col. 1, first paragrah (6 pages).

Gunter, English Translation of DE 19932552, Feb. 24, 2000, 12 pages.

International Search Report in International Application No. PCT/US16/69530, dated Apr. 7, 2017, 19 pages.

Kimura et al., "Stuck evasion control for Active Wheel Passive-Joint snake-like mobile robot 'Genbu'," Proceedings of the 2004 IEEE International Converence on Robotices 8 Automation New Orleans, LA Apr. 2004, 6 pages.

Kozlowski et al., "Modeling and control of a 4-wheel skid-steering mobile robot," International Journal of Applied Mathematics and Computer Science, 14:477-496 (2004).

Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.

* cited by examiner

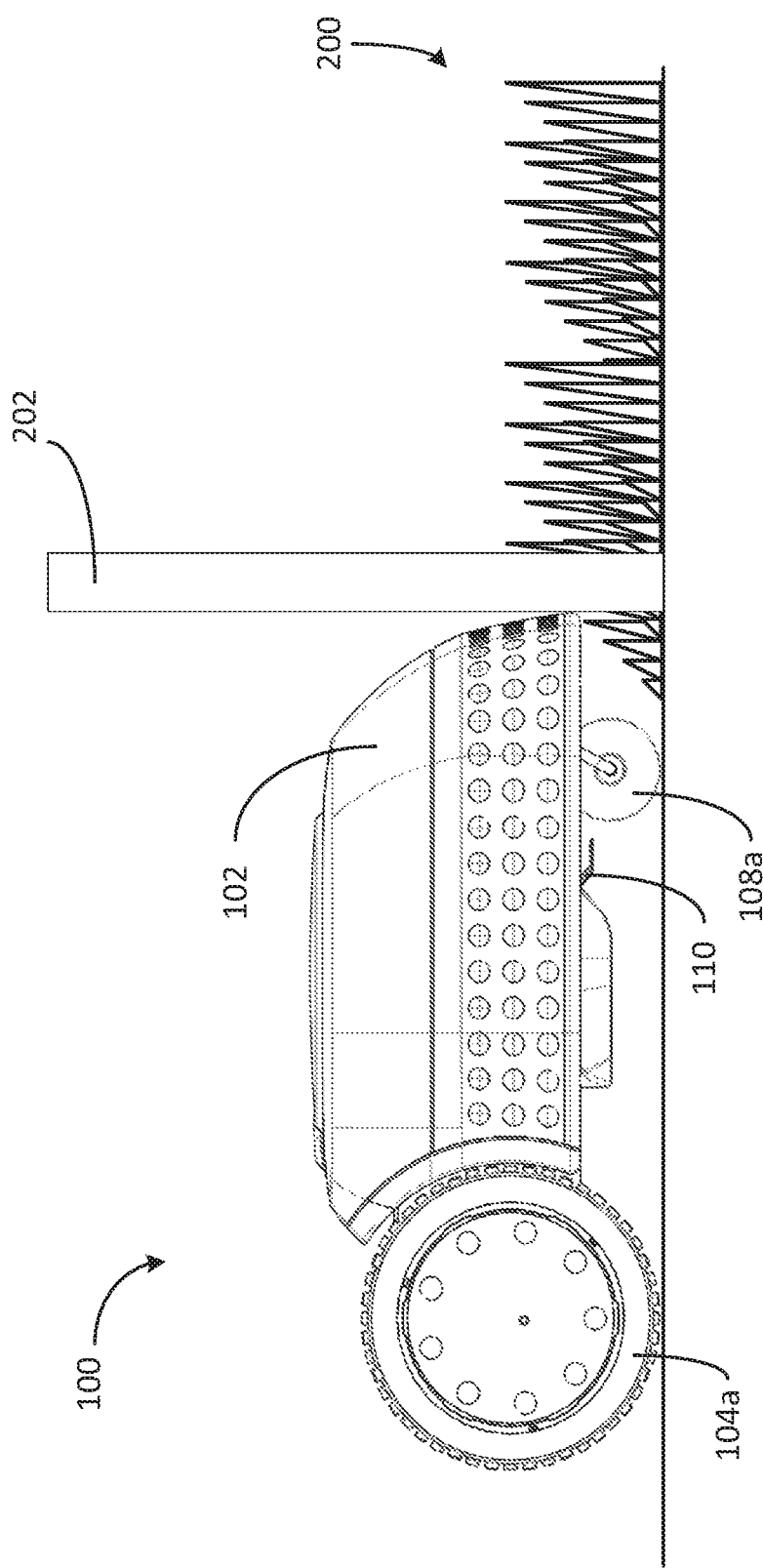

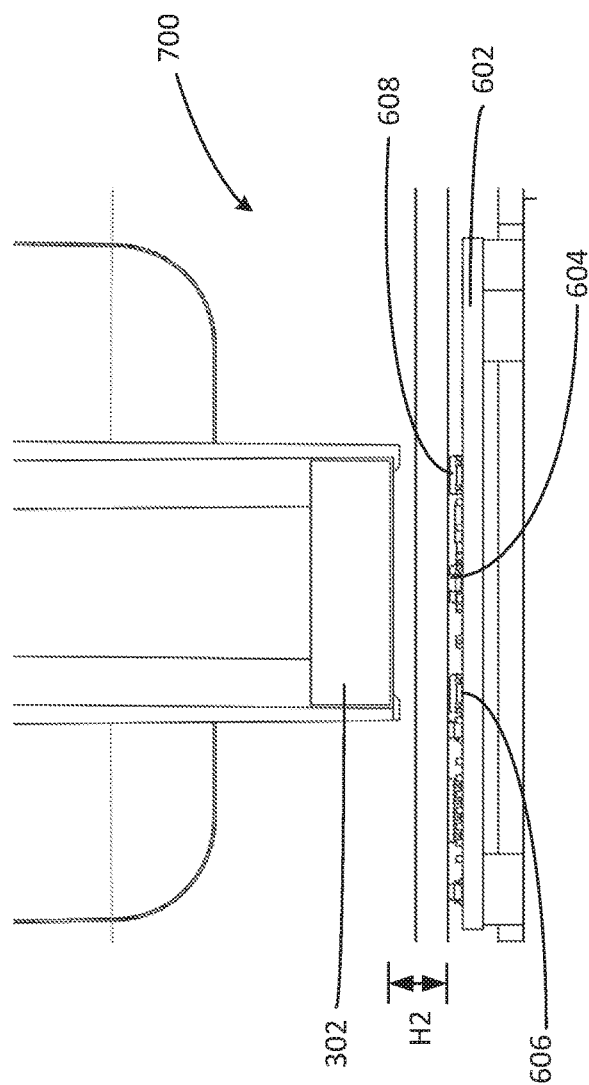
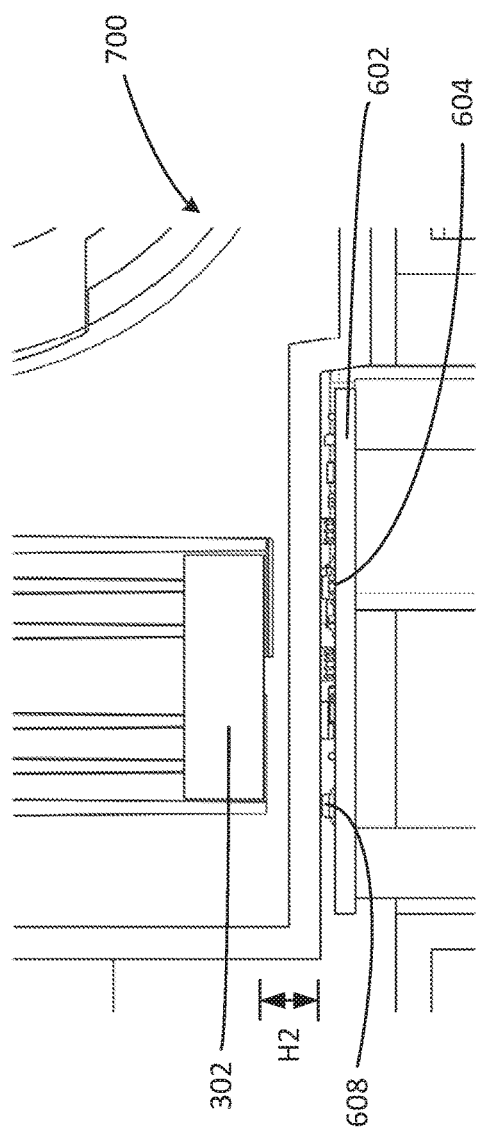
FIG. 7A
FIG. 7B

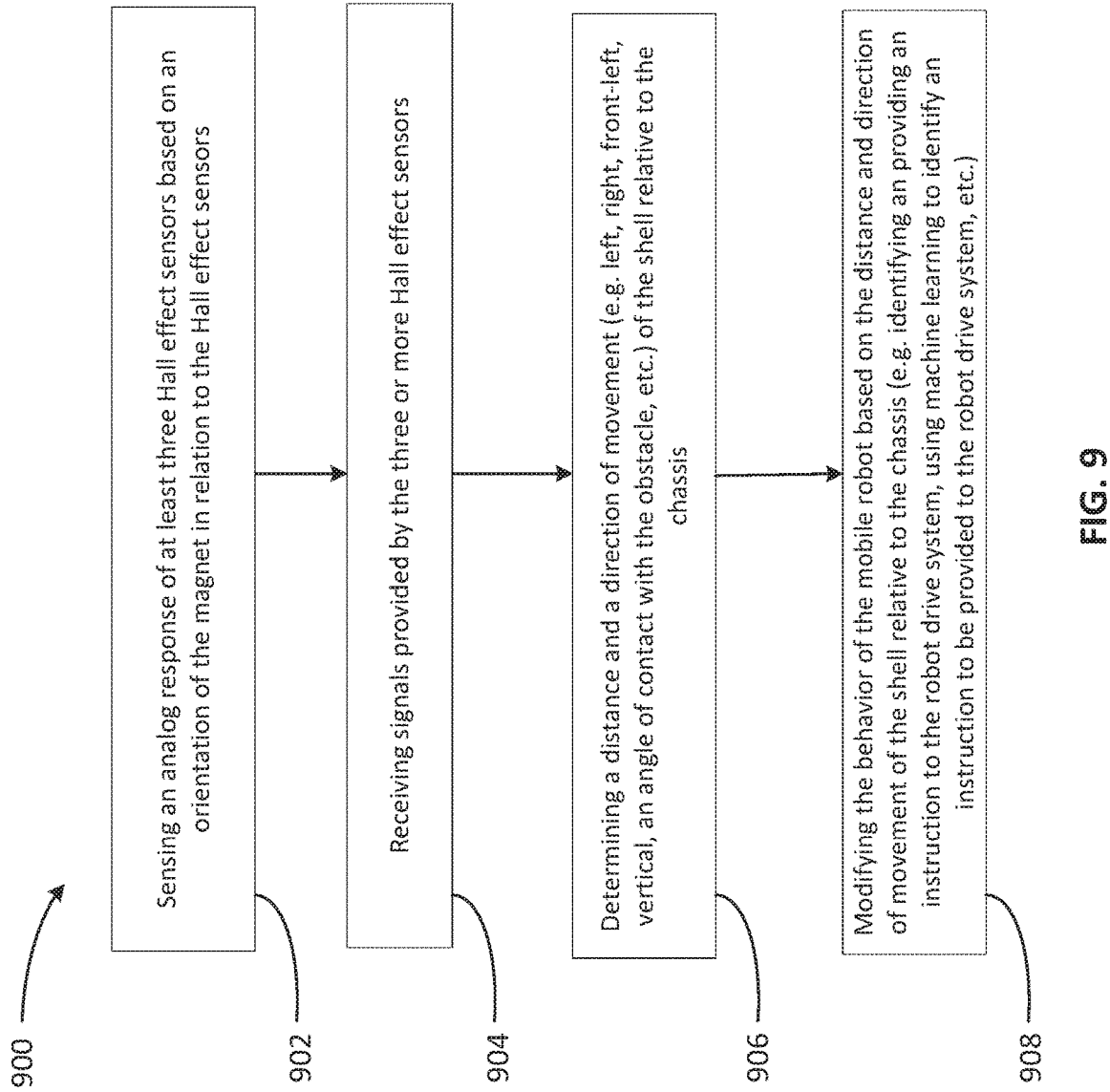

ROBOT LAWN MOWER BUMPER SYSTEM

TECHNICAL FIELD

This specification relates generally to contact sensors for a mobile robot. One exemplary contact sensor described herein is a bumper for determining contact between a robotic lawn mower and objects in the path of the robotic lawn mower.

BACKGROUND

A mobile robot operates by navigating around an environment. The mobile robot can include a shell, which contacts obstacles that the mobile robot encounters in its travels. The mobile robot can modify its behavior in response to detecting that the shell has contacted an obstacle in the environment. For example, the mobile robot can back-away from the obstacle, or otherwise alter its path.

SUMMARY

Described herein are example robots configured to traverse outdoor surfaces, such as grass or pavement, and perform various operations including, but not limited to, cutting grass. These robots can encounter obstacles, which can impede their progress. For example, during operation, the robot may contact an obstacle, such as a post, a bird bath, a ramp, a wall, etc. A determination is made (e.g. on board) that the robot has made contact with an obstacle based on a displacement of the shell of the robot relative to the chassis of the robot. A controller identifies the magnitude and direction of the shell's displacement based on signals output from a sensor assembly, which detects movement of the shell relative to the chassis.

In one aspect, a mobile robot includes a chassis, a shell moveably mounted on the chassis by a shell suspension system, and a sensor assembly configured to sense a distance and a direction of shell movement relative to the chassis. The sensor assembly further includes a magnet disposed on an underside of the shell. The sensor assembly further includes three or more Hall effect sensors disposed on the chassis in a triangular pattern at fixed distances such that the three or more Hall effect sensors are positioned beneath the magnet when no force is applied to the shell, wherein relative motion between the magnet and the Hall effect sensors causes the sensors to produce differing output signals. The mobile robot also includes a controller configured to receive output signals from the Hall effect sensors and to determine a distance and a direction of movement of the shell relative to the chassis.

In some implementations, the magnet is sized based on an amount of shell movement relative to the chassis allowed by the suspension system. In some cases, the magnet is rectangular and a center of the rectangular magnet aligns axially with a center of the triangular pattern.

In some implementations, a center of the magnet and a center of the triangular pattern are located along the center line of the robot.

In some implementations, the shell suspension system includes a plurality of suspension posts, each suspension post including a spring and a locking mechanism configured to couple the chassis to the shell. In some cases, the spring has a spring constant in the range of 2 to 10 N/mm. In some cases, each suspension post is located near a corner of the shell.

In some implementations, the sensor assembly is configured to sense at least eight differing states of contact with the shell.

In some implementations, based on the outputs from the sensors, the controller is configured to determine an angle at which the shell contacted an obstacle and determines a sequence of movements to move the mobile robot around the obstacle.

In some implementations, the center of the triangular pattern is positioned no further than 11 centimeters from the center of the chassis.

In some implementations, each of the Hall effect sensors is surrounded by a coil.

In some implementations, the sensor assembly senses no contact with an obstacle when each of the Hall effect sensors is covered by the magnet.

In some implementations, the three or more Hall effect sensors are co-located on a circuit board with a footprint area between 15 and 30 square centimeters.

In some implementations, the three or more Hall effect sensors are co-located on a circuit board and the ratio of the area of the circuit board to the area of the shell is between 150:1 and 300:1.

In some implementations, the mobile robot further includes a charge pump and a capacitor, wherein the charge pump and the capacitor are electrically connected to at least one motor of the mobile robot. In some cases, the at least one motor of the mobile robot can only operate when the capacitor is charged. In some cases, the capacitor cannot be charged unless at least one of the plurality of Hall effect sensors is covered by the magnet.

In another aspect, a method of detecting contact between a mobile robot and an obstacle includes sensing, with a sensor assembly comprising a magnet disposed on a shell of the mobile robot and three or more Hall effect sensors disposed on a chassis of the mobile robot, an analog response of three or more Hall effect sensors based on an orientation of the magnet in relation to the Hall effect sensors. The method also includes receiving, at a controller, signals provided by the three or more Hall effect sensors of the sensor assembly. The method also includes determining, by the controller, a distance and a direction of movement of the shell relative to the chassis. The method also includes modifying the behavior of the mobile robot based on the distance and direction of movement of the shell relative to the chassis.

In some implementations, determining a distance and a direction of movement of the shell relative to the chassis comprises determining from which of at least eight differing states of contact with the shell the contact occurred.

In some implementations, determining a distance and a direction of movement of the shell relative to the chassis comprises determining an angle at which the mobile robot contacted an obstacle.

In some implementations, determining a distance and a direction of movement of the shell relative to the chassis comprises using a look-up table.

In some implementations, the method further includes cutting power to a motor of the mobile robot if none of the Hall effect sensors sense the magnet.

In some implementations, the method further includes sending an electrical current through a coil surrounding a Hall effect sensor of the sensor assembly and determining, at a controller, whether the sensor assembly is functioning properly.

In some implementations, modifying the behavior of the mobile robot includes identifying and providing an instruction to a drive system of the mobile robot based on the distance and direction of shell movement relative to the chassis. In some cases, the instruction comprises a command to execute an obstacle avoidance maneuver. In some cases, the avoidance maneuver comprises a command for the mobile robot to back up a computed distance from the obstacle. In some cases, identifying and providing an instruction for a drive system of the mobile robot comprises using machine learning.

Advantages of the foregoing may include, but are not limited to, those described below and herein elsewhere. The sensor assembly can generate a range of signals in response to contact with the shell and thus can provide more than a binary "bump" or "no bump" signal to the controller, allowing for more accurate obstacle detection. Additionally, the small, sensitive sensor assembly allowing for more accurate obstacle detection being included in the large-shelled mobile robot allows the large robot, with a large turning radius, to navigate around obstacles in tight spaces. Additionally, portions of the sensor assembly described herein, including the circuit board, may be encased in order to shield the sensors from water and debris which will be contacted by the outdoor lawn mowing robot.

Another advantage of the mobile robot is its suspension system, which is designed to be stiff in the lateral (e.g. horizontal) directions such the robot does not register a bump when moving across dense or stiff grass types. The suspension system is also designed to allow easy coupling and decoupling of the shell and the chassis of the mobile robot while allowing six degrees of freedom of movement between the shell and the chassis.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF DRAWINGS

FIG. 2 is a side view of a lawn mowing robot as shown in FIGS. 1A-B contacting an obstacle.

FIG. 7A is a cross-sectional view of a lawn mowing robot looking toward the front of the robot at an exemplary sensor assembly which includes the circuit board of FIG. 6.

FIG. 7B is a side cross-sectional view of a lawn mowing robot showing the exemplary sensor assembly which includes the circuit board of FIG. 6.

FIG. 9 is a flow chart showing a process implemented by a mobile robot to detect contact with an obstacle.

DETAILED DESCRIPTION

Described herein are example robots configured to traverse outdoor surfaces, such as grass or pavement, and perform various operations including, but not limited to, cutting grass. These robots can encounter obstacles, which can impede their progress. For example, during operation, the robot may contact an obstacle, such as a post, a bird bath, a ramp, a wall, etc. A determination is made (e.g. on board) that the robot has made contact with an obstacle based on a displacement of the shell of the robot relative to the chassis of the robot. A controller identifies the magnitude and direction of the shell's displacement based on signals output from a sensor assembly, which detects movement of the shell relative to the chassis.

Sensors that may be enclosed (or otherwise shielded from the effects of weather) while retaining their functionality, including Hall sensors and inductive sensors, can be used on an outdoor robot, such as a lawn mowing robot. For example, the robotic lawn mower may include one or more arrays of Hall effect sensors stationary relative to the chassis and one or more magnets disposed on the moveable shell of the robot. In some implementations, the sensor assembly may be disposed on the shell of the robot and the magnet may be disposed on the chassis. The shell can move relative to the chassis in response to contact with an obstacle. Each Hall effect sensor provides electrical signals depending on the position of the magnet relative to that particular sensor. These electrical signals can be interpreted (e.g., processed) by a controller to identify attributes of the contact with the obstacle, such as a location of contact with the obstacle, an angle of contact with the obstacle, and a force of contact with the obstacle. A sensor assembly including an array of Hall effect sensors, such as those described herein, can be advantageous compared to a mechanical switch because the Hall effect sensors can generate a range of electrical signals (e.g. an analog signal having a range of values) in response to contact with the shell and thus can provide more than binary "bump" or "no bump" indications of obstacle detection.

Figure 1A:
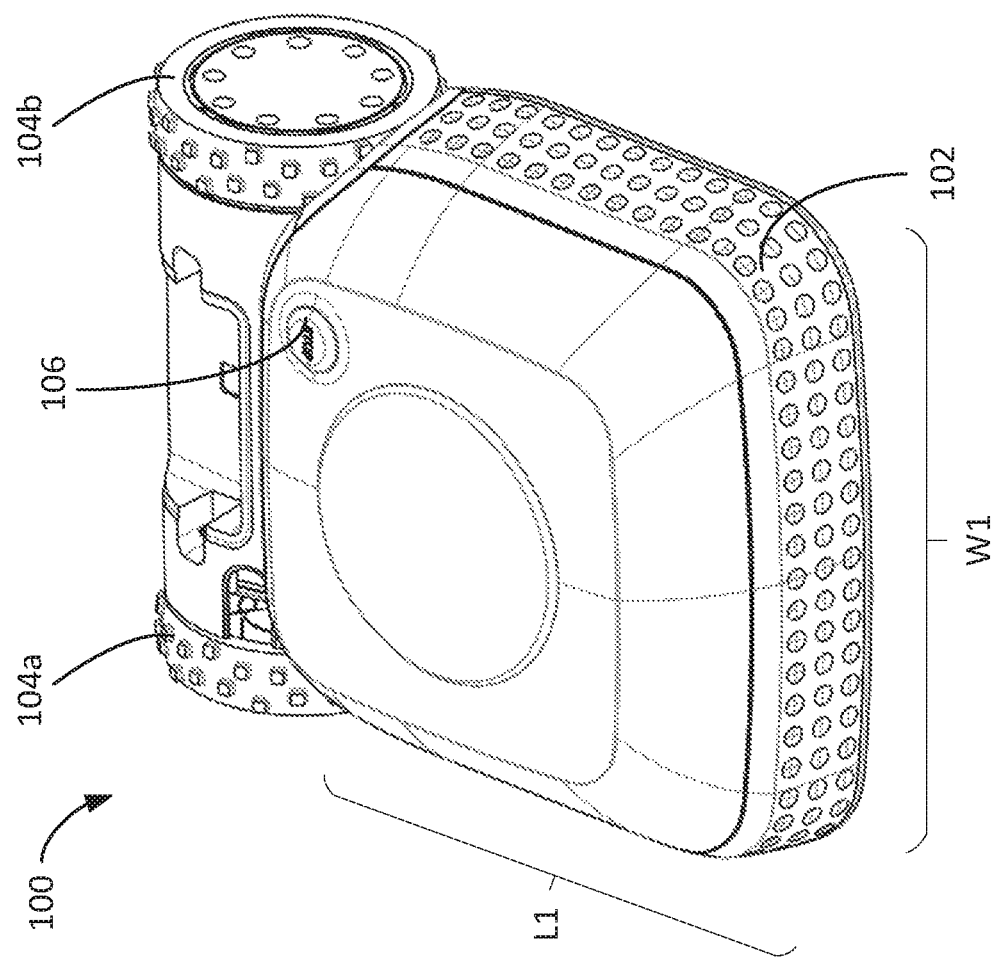
FIG. 1A is a perspective view of an exemplary lawn mowing robot.
Figure 1B:
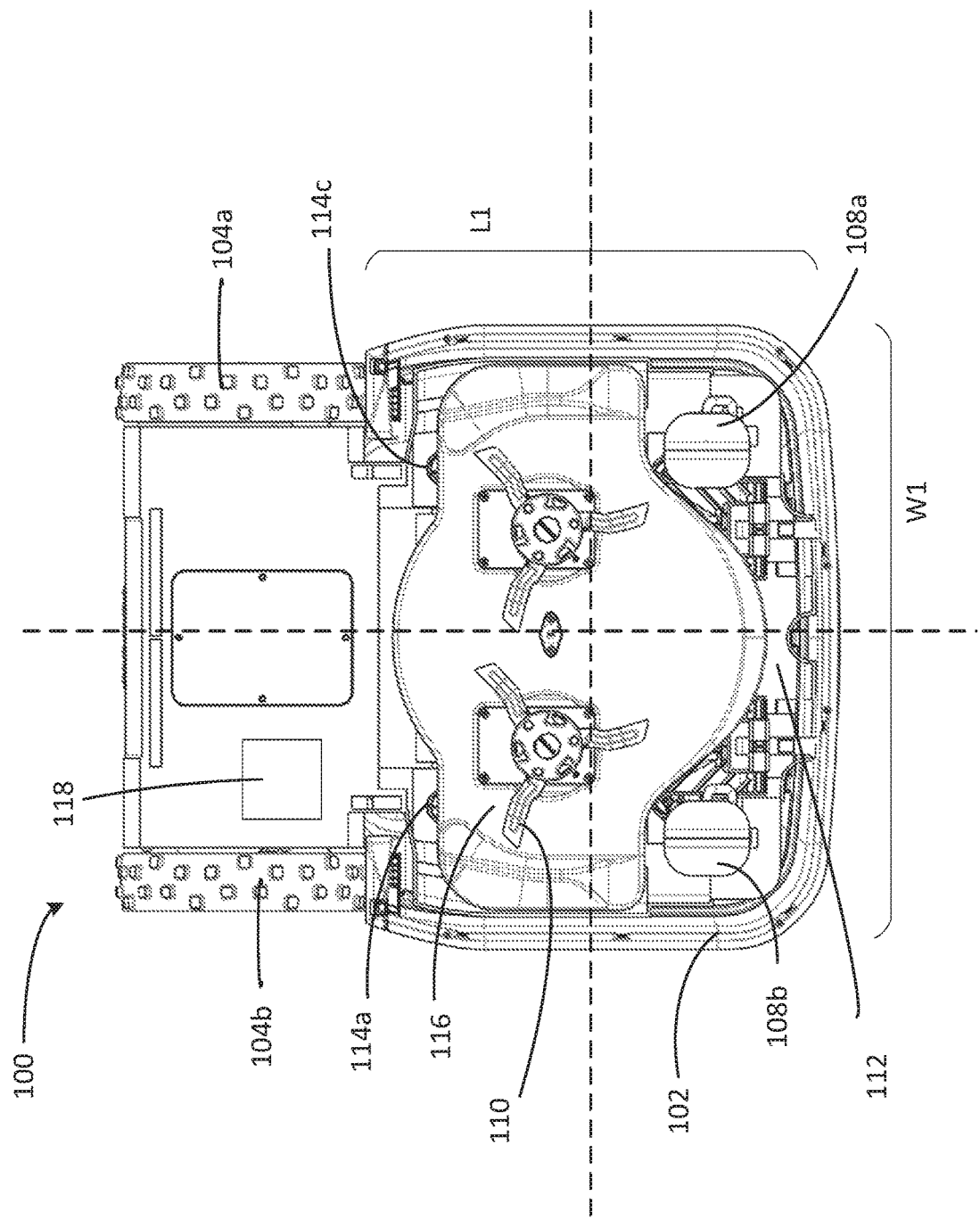
FIG. 1B is a bottom view of the lawn mowing robot shown in FIG. 1A.

FIG. 1A shows an example of a mobile lawn mowing robot 100 (also referred to as robot 100). The mobile lawn mowing robot 100 detects contact with obstacles in the environment and determines attributes of that contact, such as a location of the contact with the body of the robot. This object location detection ability allows the robot to select a maneuver, such as a turn, a back up maneuver, etc., to navigate around the obstacle. The lawn mowing robot 100 has a shell 102, rear wheels 104a and 104b, and a stop button 106. Upon the stop button 106 being depressed (e.g. by a user), all operations of the robot 100 will cease. In some implementations, the shell 102 of robot 100 has a length L1 of between approximately 40-50 cm and a width W1 of approximately between 50 and 60 cm. The lawn mowing robot 100 has cutting blades 110, which are driven by a motor, for cutting grass (FIG. 1B). The cutting blades 110 are mounted on a cutting assembly 116 which is connected to the chassis 112 of the robot 100. Front wheels 108a and 108b are attached to the chassis 112 of the robot 100. The shell 102 is connected to the chassis 112 by suspension posts 114a-114d (of which posts 114a and 114c are viewable in FIG. 1B) The suspension posts 114a-114d allow the shell 102 to move both laterally (e.g., horizontally) and axially (e.g., vertically) relative to the chassis 112 of the robot 100.

FIG. 2 shows the lawn mowing robot 100 contacting an obstacle (e.g. a post 202) while cutting a lawn. During operation, the lawn mowing robot 100 navigates across a surface, such as a lawn, and can contact obstacles, such as vertically-oriented surfaces, like that of the post 202, inclined planes, or other object surfaces. As shown here, the shell 102 of robot 100 contacts the post 202, and is displaced relative to the chassis 112 of the robot 100 (e.g. the shell generally maintains its horizontal position as it contacts the post while the chassis continues to move toward the post). In implementations, the shell 102 is suspended on the chassis 112 by a suspension system which allows six degrees of freedom of motion of the shell 102 relative to the chassis 112. As the shell 102 is displaced relative to the chassis 112, one or more sensors (e.g. included in a sensor assembly 700 as shown in FIGS. 7A and 7B) sense the relative motion and provide analog electrical signals to a controller (e.g. controller 118 shown in FIG. 1B).

Returning briefly to FIG. 1B, the controller 118 receives the electrical signals and determines one or more attributes of the contact, for example, the location, the angle, or the force of the contact. These computed attributes may be used to determine one or more properties of the obstacle contacted. For example, these properties may include the geometry of the obstacle, the global position of the obstacle in the lawn, physical properties (e.g. stiffness) of the obstacle, etc. The computed attributes may also be used by the controller 118 to determine an appropriate avoidance behavior for the robot to perform to avoid the obstacle. An avoidance behavior may cause the robot to back up a particular distance, slow to a particular velocity, follow along an obstacle, avoid an obstacle or a particular area, perform another maneuver, etc.

Figure 3A:
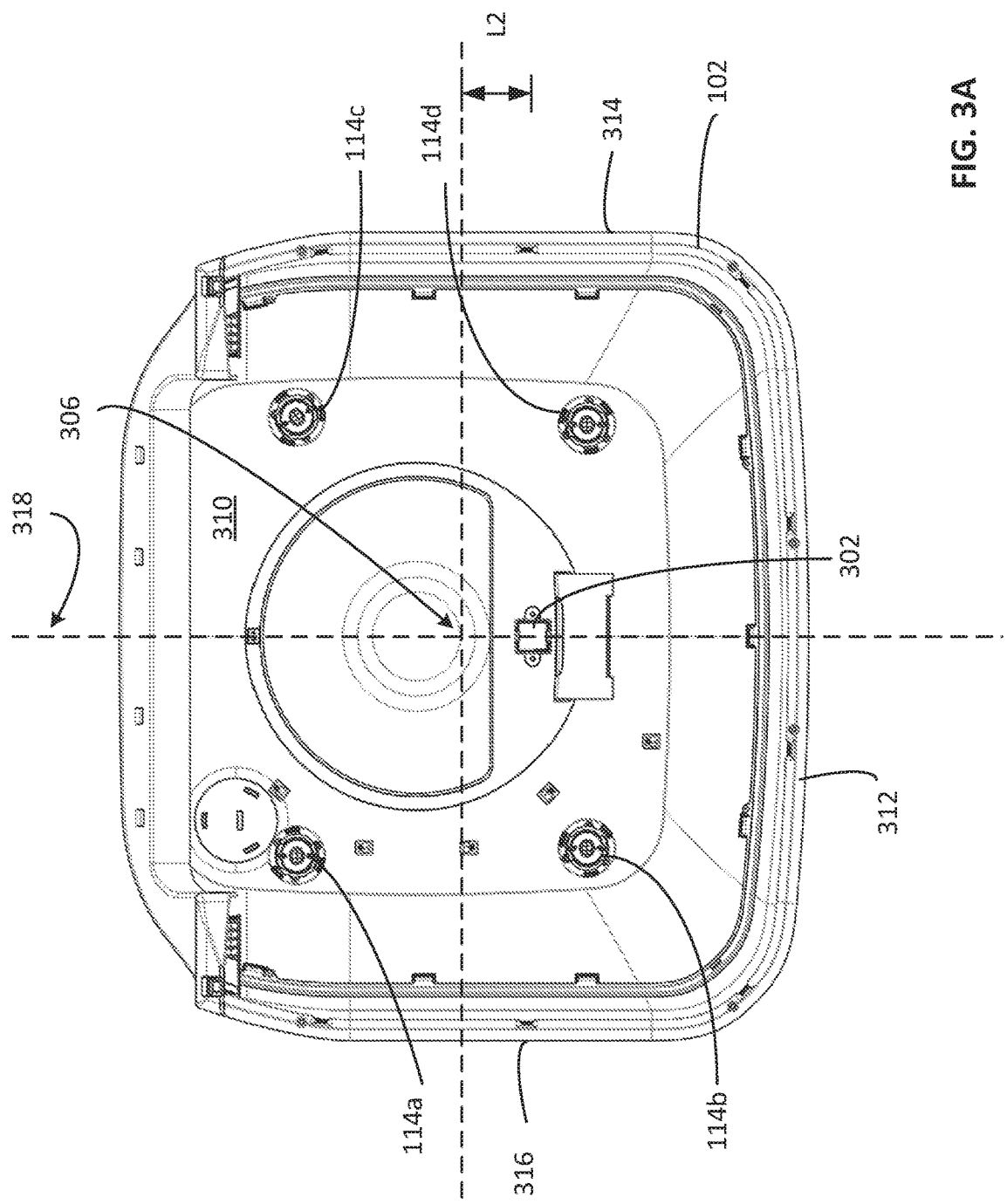
FIG. 3A is a view of the underside of an exemplary shell of the lawn mowing robot of FIGS. 1A-B with the shell separated from the robot.
Figure 3B:
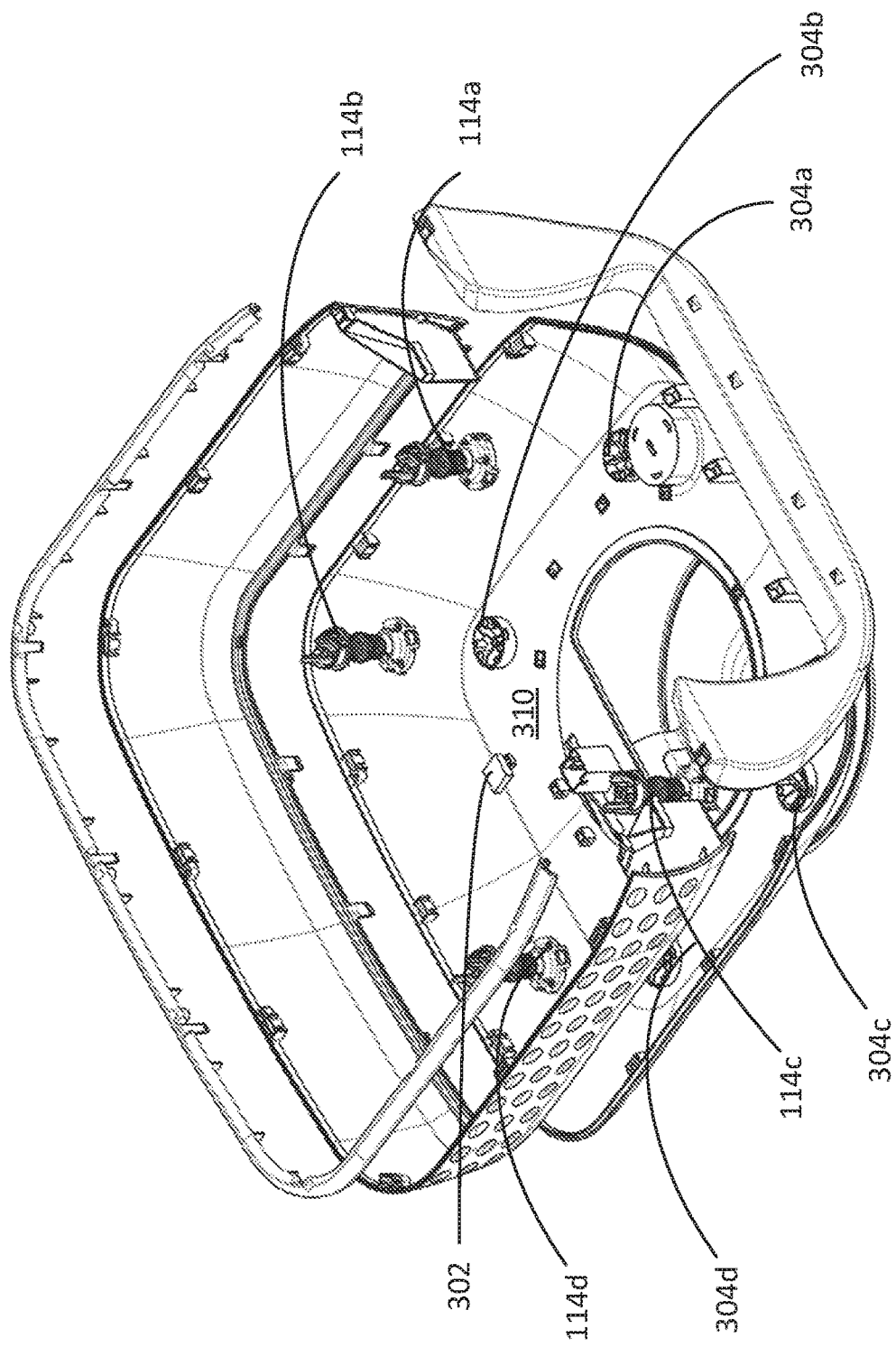
FIG. 3B is an exploded view of the underside of the shell of the lawn mowing robot of FIGS. 1A-B with the shell separated from the robot.

FIGS. 3A and 3B show an implementation of the underside of the shell 102 of the lawn mowing robot 100. The top portion 310 of the shell is generally rectangular in shape with four rounded corners. The shell has a front portion 312, a right side portion 314, and a left side portion 316. The shell 102 is attached to the chassis 112 of the robot 100 by a suspension system that includes four suspension posts 114a-114d. Each suspension post 114a-114d is located near a corner of the top portion 310 of the shell 102. The suspension system allows the shell 102 to move both laterally (e.g. horizontally) and axially (e.g. vertically) relative to the chassis 112 of the robot 100.

As the shell 102 of the robot 100 is displaced relative to the chassis 112, the sensor assembly 700 senses a direction and a distance of the relative motion of the shell 102 utilizing a magnet 302 mounted on the shell 102. In implementations, the center of the magnet 302 sits on or near a center line 318 between the right and left side portions 314, 316 of the shell 102. It is preferred to have the magnet 302 as close to the center 306 of the robot 100 as possible. Centering the magnet at the center 306 of the robot 100 reduces possible effects of different length lever arms between the contact on the shell 102 and the sensor assembly 700. In implementations, sensors included in the sensor assembly form a triangular pattern. In implementations, the center of the triangular pattern, and the center of the magnet 302 is positioned no further than 5-15 centimeters from the center of the chassis, shown as distance L2.

In implementations, multiple magnets may be used. For example, a magnet may be disposed on the shell 102 above each of the sensors included in the sensor assembly. In implementations, multiple sensor arrays may also be used. For example, multiple sensor arrays may be disposed on the chassis 112 and one or more magnets may be disposed on the shell 102 each corresponding to one of the sensor arrays.

As shown in FIG. 3B, in implementations, the suspension posts 114a-114d are attached to the shell 102 using ball joint interfaces. For each suspension post 114a-114d, a ball joint socket 304a-304d is located near a corresponding corner of the top portion 310 of the shell 102. For example, ball joint socket 304a is positioned to receive suspension post 114a. Other interfaces may be used to connect the suspension posts to the top portion 310 of the shell 102, as long as six degrees of freedom is provided for the shell to move relative to the robot 100 in this implementation.

Figure 4B:
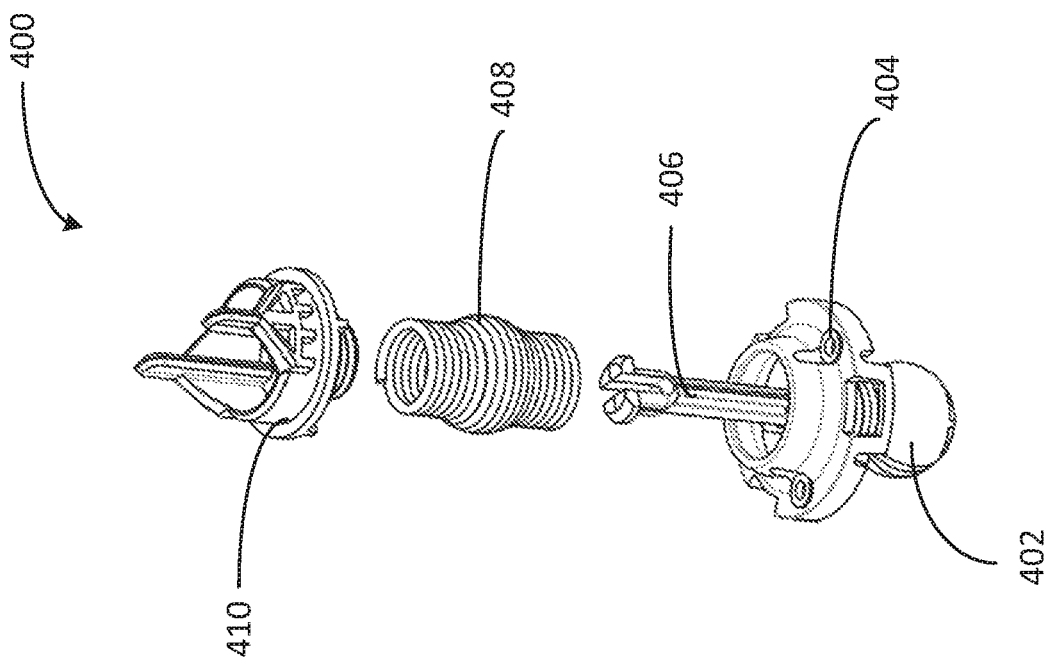
FIG. 4A-B are exploded views of exemplary suspension posts for coupling the shell of the robot to the chassis.
Figure 4A:
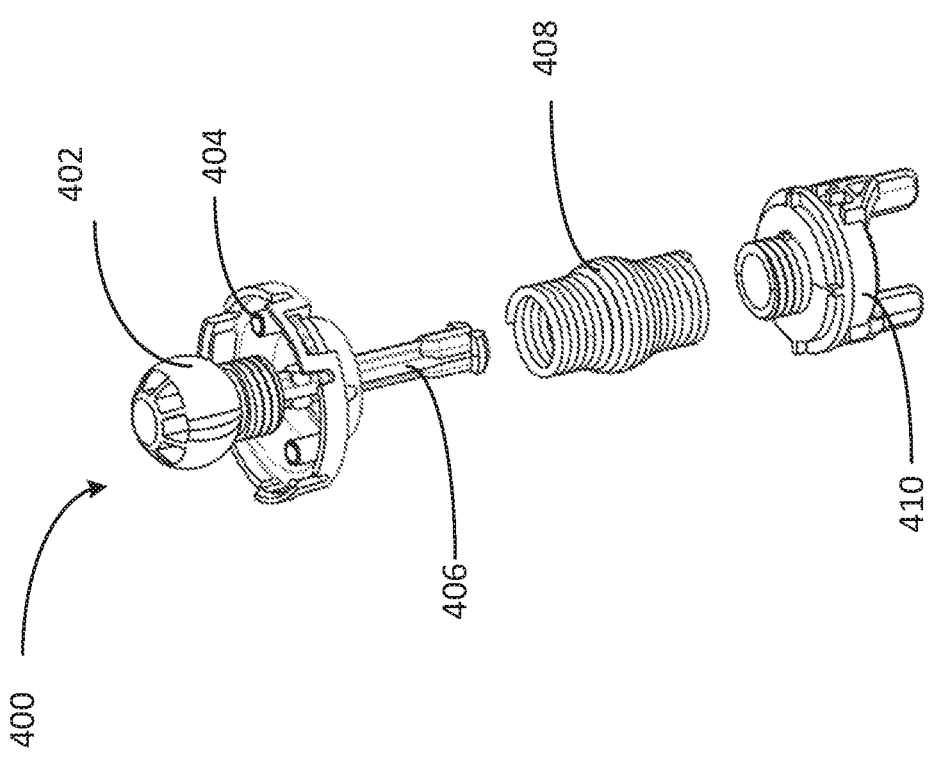

Suspension posts 114a-114d couple the shell 102 to the chassis 112 while allowing for simple decoupling of the shell 102 from the chassis 112. FIGS. 4A and 4B show exploded views of a suspension post 400 (which may be, for example, one of suspension posts 114a-114d). In particular, FIG. 4A presents a perspective view of the post 400 while FIG. 4B presents an inverted view. The suspension post 400 includes a spring 408, a locking mechanism 410, a ball joint 402, and a length-limiting element 406. To assemble a suspension post 400, the length limiting element 406 is inserted through spring 408 and into locking mechanism 410. The springs 408 are shaped such that the springs 408 avoid contacting the side walls of the shell 102 even during the maximum displacement of the shell 102 relative to the chassis 112 in any direction. In implementations, the suspension post 400 may alternatively or additionally be secured to the shell 102 with screws inserted through screw bosses 404. In implementations, the spring 408 may be a barrel spring, a straight, cylindrical spring, etc. The spring constant of the spring 408 is within the range from 2 to 10 N/mm.

It is advantageous for the suspension system to be stiff in the lateral (e.g. horizontal) directions because some grass types (especially those types that are particularly dense or stiff) may be registered by the robot 100 as a bump when moving across the grass. Registering a bump upon contacting grass with the shell 102 is undesired, as the robot 100 is intended to drive over, and cut, the grass. However, in the axial (e.g. vertical) direction, the suspension system does not need to be particularly stiff because the robot 100 must be able to sense when the shell 102 of the robot 100 is being lifted in relation to the chassis 112 or wedged. Sensing a lifting of the shell 102 relative to the chassis 112 is safety-critical for a lawn mowing robot 100 because the cutting blades 110 on the underside of the robot 100 may be exposed if the robot 100 is lifted. As such, the sensing assembly is designed such that the robot 100 powers down its actuators if the shell is lifted past a certain threshold distance, which may for example, be between 3 and 8 mm.

Additionally, a suspension system that is stiff in the lateral (e.g. horizontal) directions allows for better "homing", e.g. re-centering, of the shell 102 relative to the chassis 112. In other systems, when experiencing a light bump, friction between the coils of a spring 408 could limit the ability of a shell 102 to re-center itself relative to the chassis 112. The easier that the shell 102 re-centers itself relative to the chassis, the less need there is for re-calibration of the positioning of the shell 102 during operation. Further, in a robot such as a lawn mowing robot 100, where safety is a critical concern, shell calibration during operation of the robot 100 would be disfavored.

Figure 5A:
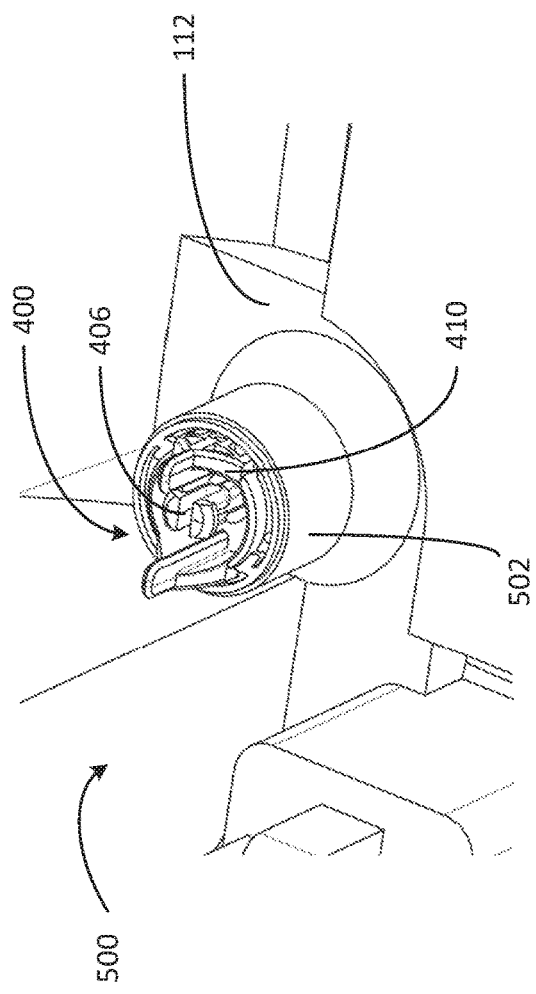
FIGS. 5A-5B are perspective views of exemplary suspension posts in the sockets of the chassis in an unlocked position and a locked position.
Figure 5B:
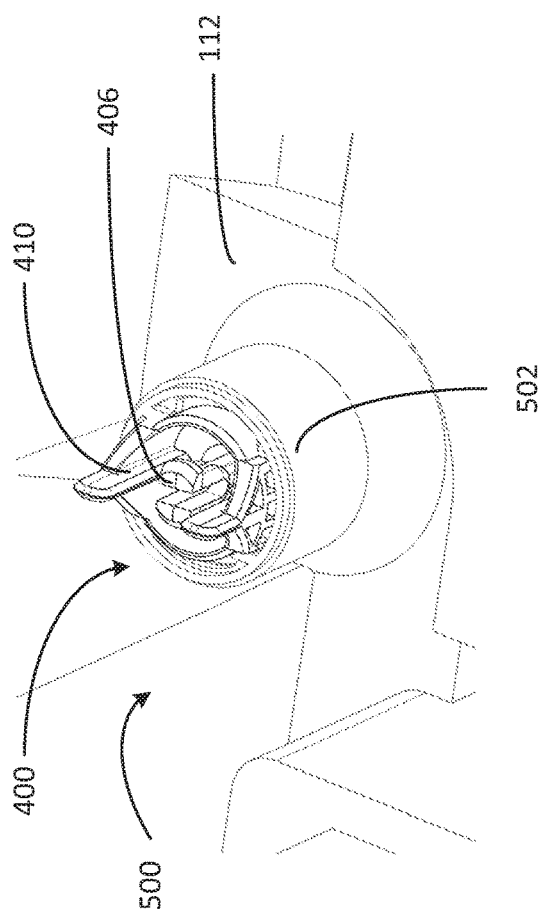

FIG. 5A shows an interface 500 with a locking mechanism 410 of the suspension post 400 in an unlocked position. FIG. 5B shows the interface 500 with the locking mechanism 410 of suspension post 400 in a locked position. To couple the chassis 112 to the shell 102 using a suspension post 400, the chassis 112 is aligned with the such that the length-limiting element 406 of the suspension post 400 protrudes into a socket 502 of the chassis 112. Then, the locking mechanism 410 is inserted over the top of the length-limiting element 406 of the suspension post 400 such that the length-limiting element 406 extends through the center of the locking mechanism 410. This unlocked configuration is shown in FIG. 5A. To lock the chassis 112 to the shell 102, the locking mechanism 410 is turned 90 degrees in this implementation. This locked configuration is shown in FIG. 5B. The coupling process is repeated at each corner (or location of a suspension post on the shell 102) of the robot 100 for each suspension post (e.g. posts 114a-114d shown in FIG. 3A). This process of coupling the shell 102 to the chassis 112 at the corners of the robot 100 is advantageous because it allows for easy assembly and removal of the shell 102 of the robot 100. This coupling process is also advantageous because it allows the shell 102 to float relative to the chassis 112 and maintain six degrees of freedom.

Figure 6:
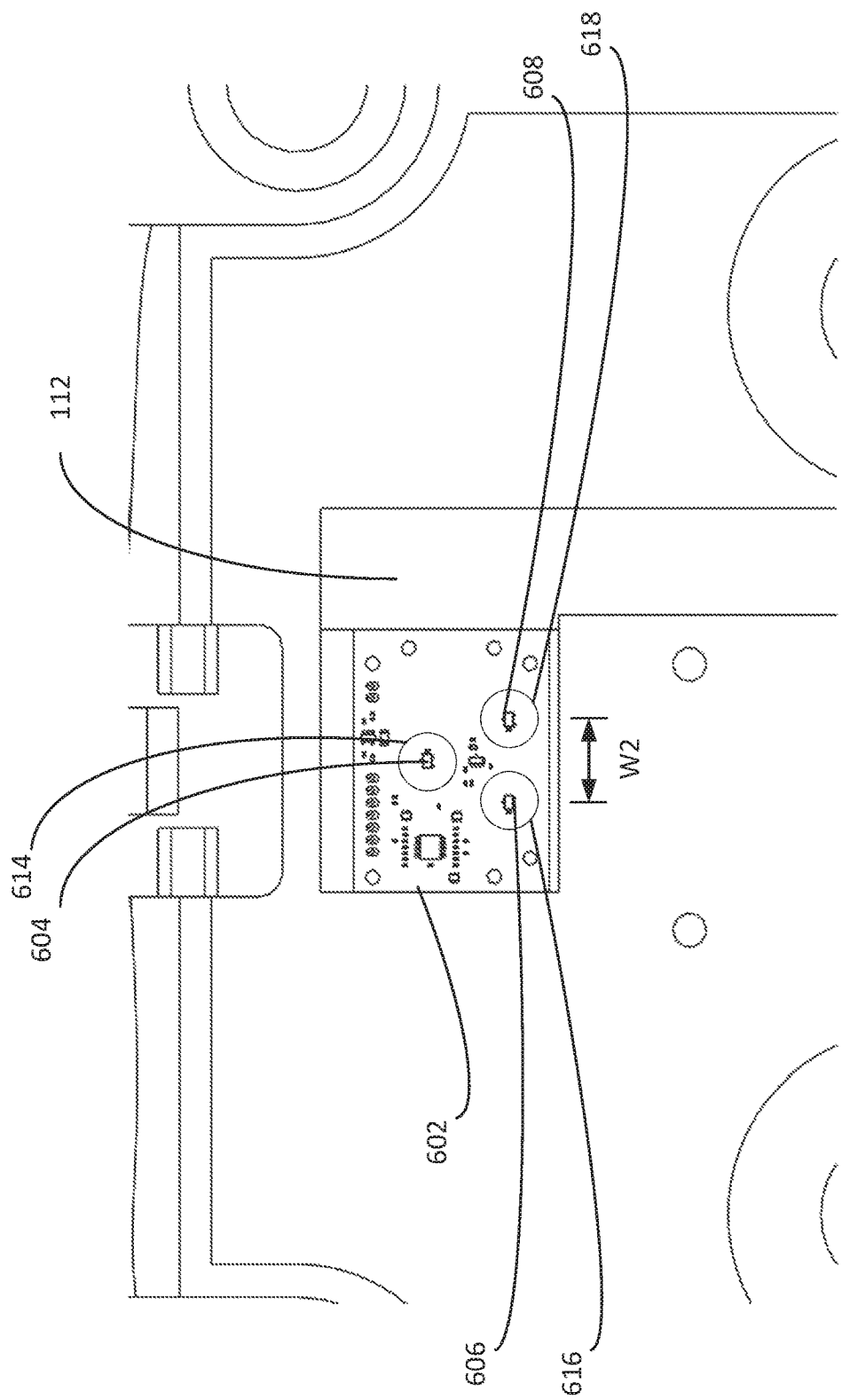
FIG. 6 is a top view of a section of the chassis of an exemplary lawn mowing robot having a circuit board containing Hall effect sensors mounted thereon.

The sensor assembly (e.g. sensor assembly 700 shown in FIGS. 7A and 7B) of robot 100 includes a circuit board which includes the one or more sensors. FIG. 6 shows an example of a circuit board 602 mounted on the chassis 112. The circuit board 602 includes three Hall effect sensors, 604, 606, and 608, arranged in a triangular pattern (e.g. an equilateral triangle). Hall effect sensor 604 is located forward of sensors 606 and 608 on the robot chassis 112. The triangular pattern of the Hall effect sensors 604, 606, and 608, and the sizing of the magnet 302 facing the sensors allow for directional bump sensing.

In implementations, each of the three Hall effect sensors is surrounded by a coil, 614, 616, and 618, respectively, which is built into the circuit board 602. The coils may be used in running diagnostics on the sensor assembly 700 (shown in FIGS. 7A and 7B) and the circuitry of the robot 100. During testing, for example, an electrical test current can be provided to a coil, which will produce a magnetic field to be sensed by the corresponding Hall effect sensor. This electrical test current may be provided while the magnet 302 is within range of the Hall effect sensor or while it is out of range of the Hall effect sensor.

The Hall effect sensor produces a signal (e.g. a voltage signal) based on the magnetic field being sensed. This output voltage can be sent to a controller (e.g. controller 118 shown in FIG. 1B) for analysis. In implementations, each of the Hall effect sensors may be surrounded by a coil that allows diagnostic testing to be performed. Electrical current may be sent through the coil, creating a magnetic field, thus changing the output voltage of the Hall effect sensor. The electrical current may be sent through the coil, and diagnostics may therefore be run, during operation of the robot 100 and also when the robot 100 is not operating.

When performing diagnostic testing during operation of the robot 100, the portion of the output voltage due to the magnetic field created by the electrical current running through the coil and the portion of the output voltage created by the presence of the magnet 302, can be separated. As the magnet 302 is a permanent magnet, the portion of the signal due to the magnet 302 generally has an unchanging level. A frequency component can be introduced into the signal from the excitation of the bumper (e.g. the bumper contacts an object and the magnetic field sensed due to the magnet 302 changes). The coils may be excited at a particular frequency, which allows for filtering out this portion of the output signal. Separation of the portions of the output voltage can be achieved using a band pass filter, which can also filter out high frequency noise in the system.

The portion of the output signal created by the electrical test current in the coil can be compared to a predicted output to ensure that the Hall sensor surrounded by the coil, as well as other circuitry components, such as amplifiers, are functioning properly. Electrical test currents can be input into all three coils at one time, or on individual coils. Additionally, diagnostic testing can be performed while the robot 100 is operating due to the ability to separate the portions of the output voltage due to the testing and due to normal operation above.

FIG. 7A shows a cross-sectional view of a portion of the robot 100 taken from behind the sensor assembly 700 and looking forward toward the sensor assembly 700. FIG. 7B shows a cross-sectional view of a portion of the robot 100 taken from the left side of the sensor assembly 700 and looking rightward toward the sensor assembly 700. The magnet 302 is disposed on an underside of the shell 102 and the circuit board 602 is disposed on the chassis 112. As shown in these figures, the magnet 302 floats over the circuit board 602 as the shell 102 is displaced relative to the chassis 112. Depending on the magnet's position above the circuit board 602, one or more of the Hall effect sensors, 604, 606, and 608, may sense the presence of the magnet 302. Axial spacing H2 between the magnet 302 and the circuit board 602 in this example is approximately 5-8 mm. When the magnetic field of the magnet 302 is sensed by a Hall sensor 604, 606, or 608, on the circuit board 602, the magnet 302 is said to be "covering" the sensor.

The magnet 302 may be sized in relation to the travel distance of the shell 102. In the front-to-back direction, the magnet's dimension should be at least as long as the total desired front-to-back shell travel. Therefore, for example, when the magnet 302 is pushed backward during a front bump, the magnetic field of the magnet 302 still covers Hall effect sensors 606 and 608. In the right-to-left direction, the magnet must be at least as long as twice the desired shell travel on one side. Therefore, for example, when the shell 102 is bumped from the right, the magnetic field of the magnet 302 still covers Hall effect sensors 604 and 608. In one embodiment, the magnet is 19 mm by 19 mm (shown by distances L3 and W3 in FIG. 8A) and the total shell travel is 15 mm in the front-to-back direction and the total shell travel on either the right side or the left side is 8 mm.

The magnet 302, and the footprint of the triangle of Hall effect sensors, 604, 606, and 608, may also be sized in relation to the overall dimensions of the shell 102. In one implementation, the magnet 302 is 19 mm by 19 mm, the shell 102 is 471 by 534 mm, and the triangle separating the Hall effect sensors 604, 606, and 608 has legs of a length of approximately 21 mm, shown as distance W2 in FIG. 6. In other implementations, depending on the required travel of the shell 102 and the dimensions of the robot, the Hall effect sensors 604, 606, and 608 could be arranged in other shapes besides an equilateral triangle.

It is advantageous to implement a small, sensitive sensor assembly 700, such as the one described herein, on a robot 100 with a large shell (e.g., shell 102). A large-shelled robot has a larger turning radius than a smaller-shelled robot and may require more directional information to effectively navigate around an obstacle. For example, small robot may be able to navigate around an obstacle in a tight space based on knowing that it was bumped on the front of its shell. However, for a large robot with a bigger turning radius, more directional data may be required to navigate in tighter spaces. The spacing of the Hall effect sensors 604, 606, and 608, in relation to the magnet 302, allows for accurate sensing of obstacle contact over the area of the large shell, while the sensor assembly 700 takes up less space comparatively. In implementations, the Hall effect sensors 604, 606, and 608 are co-located on a circuit board 602 with a footprint area between 15 and 30 square centimeters. Additionally, in implementations, the ratio of the area of the circuit board 602 to the area of the shell 102 is between 150:1 and 300:1.

It is also advantageous to employ a sensor assembly 700 lacking mechanical parts for a robot 100 to be employed outside and exposed to the elements, including rain and varying temperatures. The circuit board 602 may be encased in order to shield the sensors 604, 606, and 608 from water and debris.

Figure 8A:
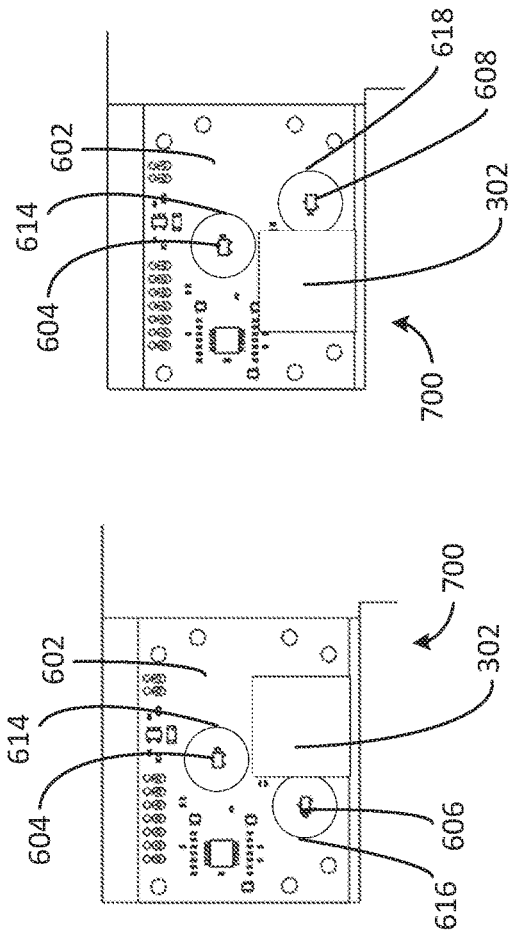
FIG. 8A is a top view of the exemplary sensor assembly during a front bump of the shell.

FIGS. 8A-8F illustrate differing states of the sensor assembly 700 which occur based on the location and force of a contact between an obstacle and the shell 102 of the robot 100. In FIG. 8A, the shell 102 contacts an obstacle on its front portion 312 (as shown in FIG. 3A). As the shell 102 is displaced backward in relation to the chassis 112, the magnet 302 also shifts backward in relation to the circuit board 602. As the magnet 302 shifts backward, Hall effect sensor 604 is out of range of the magnetic field of the magnet 302 and is therefore uncovered by the magnet. Because the magnet no longer covers Hall effect sensor 604, the output voltage of the sensor reduces in level. During this front bump, all three Hall effect sensors 604, 606, and 608 send outputs to a controller 118 on the robot 100. The controller 118 can determine that the output of sensor 604 is low, and therefore that the sensor 604 is uncovered by magnet 302 because it is out of range of the magnetic field of the magnet 302. Because of the geometry of the sensor assembly 700, the controller 118 can determine that because sensor 604 is uncovered while sensors 606 and 608 are covered, a front bump has occurred.

Figure 8B:
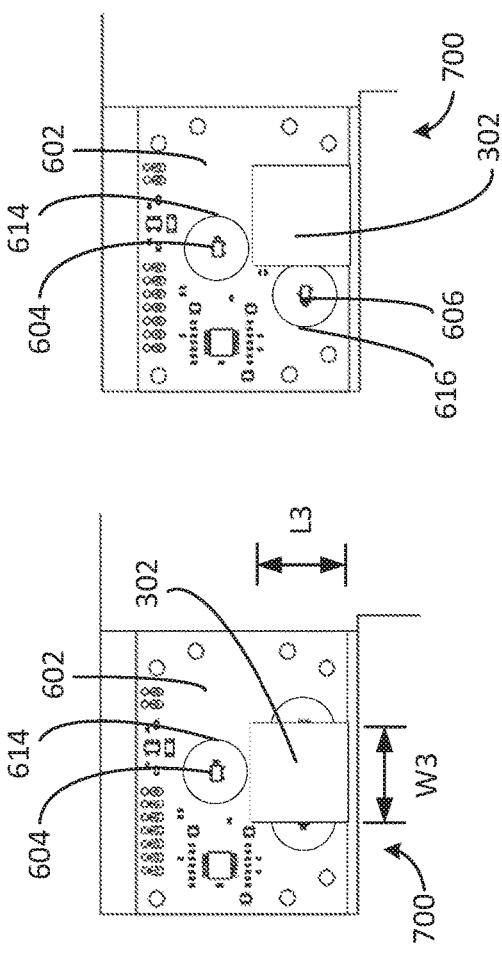
FIG. 8B is a top view of the exemplary sensor assembly during a front-left bump of the shell.
Figure 8C:
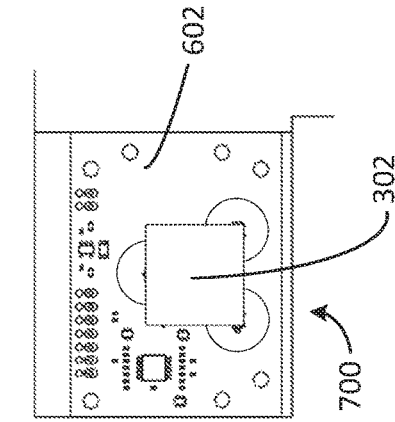
FIG. 8C is a top view of the exemplary sensor assembly during a front-right bump of the shell.
Figure 8D:
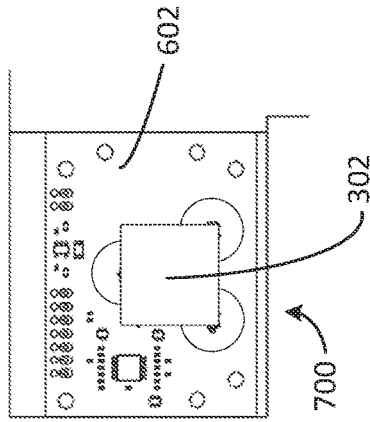
FIG. 8D is a top view of the exemplary sensor assembly during a left bump of the shell.
Figure 8E:
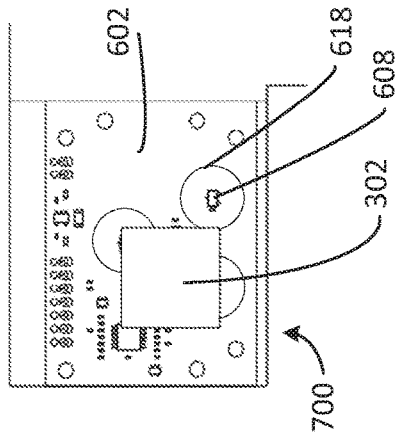
FIG. 8E is a top view of the exemplary sensor assembly during a right bump of the shell.
Figure 8F:
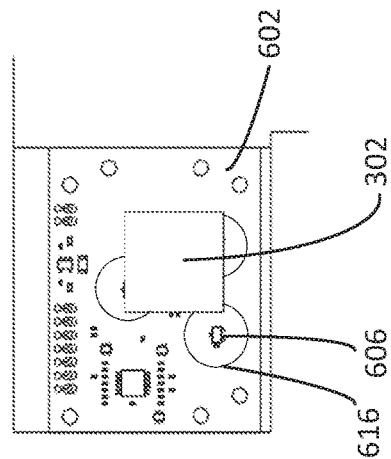
FIG. 8F is a top view of the exemplary sensor assembly at its home position, e.g. during no bump of the shell.

FIGS. 8B-8F show differing states of the sensor assembly 700 based upon the position of the shell 102 relative to the chassis 112. During a front-left bump, as shown in FIG. 8B, both sensors 604 and 606 become out of range of the magnetic field of the magnet 302, and are therefore uncovered by the magnet 302. In FIG. 8C, during a front-right bump, sensors 604 and 608 become out of range of the magnetic field of the magnet 302, and are therefore uncovered by the magnet. In FIG. 8D, during a left bump, sensor 606 is out of range of the magnetic field of the magnet 302. During a right bump, as shown in FIG. 8E, sensor 608 is out of range of the magnetic field of the magnet 302. In FIG. 8F, when no bump occurs, all three sensors 604, 606, and 608, are covered by (e.g. within the range of the magnetic field of), the magnet 302. The differing output voltages of the sensors 604, 606, and 608 in each of these states allows the controller 118 to determine the location of the bump on the shell 102.

Further, using the voltages output by the sensors 604, 606, and 608, the controller 118 can determine an angle of the bump in relation to the center of the robot 100. If the controller 118 knows the specific angle at which the shell 102 of the robot 100 was bumped, it may instruct the robot 100 to perform a specific back up, or other maneuver, to avoid the obstacle that caused the bump.

Machine learning could be implemented in robot 100. As more contacts with the shell 102 of the robot 100 occur, and more robot maneuvers are commanded in response to those contacts, the controller 118 can learn which maneuvers work better for avoiding the obstacle when the contact with the obstacle occurred at a particular angle. Machine learning could lead to more efficient navigation around obstacles.

Turning back to FIG. 6, the state of the sensor assembly 700 is illustrated during a lift of the shell 102 relative to the robot chassis 112. During a lift event, all of the Hall effect sensors 604, 606, and 608, move away from the magnet 302, and their output signal levels reduce. Because of the rotating cutting blades 110 of the lawn mowing robot 100, it is important to be able to shut down the operation of these blades when the shell 102, which covers the cutting blades 110, is lifted. This shut down procedure can be executed in multiple ways. For example, the output of the circuit including all three Hall effect sensors 604, 606, and 608, can be connected to a charge pump. The charge pump may charge a capacitor, which when charged, allows the motor of the lawn mowing robot 100 to run. When none of the three Hall effect sensors 604, 606, and 608, can sense the magnetic field of the magnet 302, the charge pump cannot charge the capacitor adequately and the power to the motor of the robot 100 is removed.

Referring to FIG. 9, a flow chart 900 is depicted showing an implementation of a method of detecting contact between a mobile robot and an obstacle. The method of detecting contact between a mobile robot and an obstacle includes, sensing 902, with a sensor assembly 700 comprising a magnet disposed on a shell of the mobile robot and three or more Hall effect sensors disposed on a chassis of the mobile robot, an analog response of three or more Hall effect sensors based on an orientation of the magnet in relation to the Hall effect sensors. For example, there may be three Hall effect sensors 604, 606, and 608 set up in a triangular pattern as depicted in FIG. 6. As the magnet floats over the sensor board as shown in FIGS. 8A-8F, differing orientations of the magnet in relation to the sensors changes the analog responses of the sensors. There may also be more than three Hall effect sensors arranged on a sensor board in a desirable pattern (e.g. a square, hexagon, etc.) such that differing orientations of the magnet in relation to the sensors may be captured.

Flow chart 900 also includes, receiving 904, at a controller 118, signals provided by the three or more Hall effect sensors of the sensor assembly 700. The signals provided by the three or more Hall effect sensors may be the analog responses (e.g. voltage outputs) of the sensors to the varying orientations of the magnet in relation to the sensors.

Flow chart 900 further includes, determining 906, by the controller 118, a distance and a direction of movement of the shell 102 relative to the chassis 112. For example, determining a distance and a direction of movement of the shell 102 relative to the chassis 112 may include determining from which of at least eight differing directions of contact with the shell 102 the contact occurred (e.g. right, left, front-right, front-left, lift, etc.). For example, if the shell 102 of the robot 100 made contact with an obstacle on the front portion 312 of the shell 102 (see FIG. 3A), the orientation of the magnet 302 and the sensors 604, 606, and 608 would be similar to the orientation depicted in FIG. 8A, and the voltages provided by the sensors 604, 606, and 608 to the controller 118 allow the controller 118 to determine that the direction of the contact is from the front of the robot 100.

In another example, determining a distance and a direction of movement of the shell 102 relative to the chassis 112 includes determining an angle at which the mobile robot 100 contacted an obstacle. For example, by using a look-up table, a controller 118 may match the signals provided by the Hall effect sensors 604, 606, and 608 to values in a look-up table to determine an angle of contact.

Flow chart 900 also includes, modifying 908 the behavior of the mobile robot 100 based on the distance and direction of movement of the shell 102 relative to the chassis 112. Modifying the behavior of the mobile robot 100 includes identifying and providing an instruction to a drive system of the mobile robot 100 based on the distance and direction of shell 102 movement relative to the chassis 112. For example, as shown in FIG. 2, the controller 118 may determine that the shell 102 has been bumped from the front by an obstacle (e.g. post 202) and identify and provide an instruction to the drive system of the robot 100 to avoid the post 202, for example an instruction to back up a set distance.

In another example, in identifying and providing an instruction for a drive system of the mobile robot 100 the controller 118 employs machine learning. As more contacts with the shell 102 of the robot 100 occur, and more robot maneuvers are commanded in response to those contacts, the controller 118 can learn which maneuvers work best for avoiding the obstacle when the contact with the obstacle occurred at a particular angle. Machine learning could lead to more efficient navigation around obstacles. For example, through machine learning, the controller 118 may learn that a contact near a corner may indicate that the robot 100 does not need to back up as far as if the contact was in the middle of one of the sides of the shell 102 in order to navigate around the obstacle. The controller 118 may learn an appropriate set distance for backing up to navigate around an obstacle based on the geometry of the contact.

Operations shown in flow chart 900 may be executed by components of the lawn mowing robot 100, including sensor assembly 700 (shown in FIGS. 7A and 7B) and controller 118 (shown in FIG. 1B).

A computer program can be written in any form of programming language, including compiled or interpreted languages, and it can be deployed in any form, including as a stand-alone program or as a module, component, subroutine, or other unit suitable for use in a computing environment.

Operations associated with implementing all or part of the object detection techniques described herein can be performed by one or more programmable processors executing one or more computer programs to perform the functions described herein. Control over all or part of the wall following techniques described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A mobile robot comprising:
    a chassis;
    a shell moveably mounted on the chassis by a shell suspension system;
    a sensor assembly comprising:
        a magnet disposed on the shell, and
        three or more Hall effect sensors disposed on the chassis in a triangular pattern at fixed distances such that the three or more Hall effect sensors are covered by the magnet absent contact between the shell and an obstacle and such that at least one of the three or more Hall effect sensors is uncovered in response to the contact between the shell and the obstacle, wherein relative motion between the magnet and the three or more Hall effect sensors causes the three or more Hall effect sensors to produce differing output signals; and
    a controller, configured to receive the output signals from the three or more Hall effect sensors and to determine a distance and a direction of movement of the shell relative to the chassis.

2. The mobile robot of claim 1, wherein the magnet is sized based on an amount of shell movement relative to the chassis allowed by the shell suspension system.

3. The mobile robot of claim 2, wherein the magnet is rectangular and a center of the magnet aligns axially with a center of the triangular pattern.

4. The mobile robot of claim 1, wherein a center of the magnet and a center of the triangular pattern are located along a center line of the mobile robot.

5. The mobile robot of claim 1, wherein the shell suspension system comprises:
    a plurality of suspension posts, each of the plurality of suspension posts comprising:
        a corresponding spring; and
        a corresponding locking mechanism configured to couple the chassis to the shell.

6. The mobile robot of claim 5, wherein the corresponding spring of each of the plurality of suspension posts has a spring constant in a range of 2 to 10 N/mm.

7. The mobile robot of claim 5, wherein each of the plurality of suspension posts is located near a corner of the shell.

8. The mobile robot of claim 1, wherein the sensor assembly is configured to sense at least eight differing states of contact with the shell.

9. The mobile robot of claim 1, wherein, based on the output signals from the Hall effect sensors, the controller is configured to determine an angle at which the shell contacted the obstacle and determine a sequence of movements to move the mobile robot around the obstacle.

10. The mobile robot of claim 1, wherein a center of the triangular pattern is positioned no further than 11 centimeters from a center of the chassis.

11. The mobile robot of claim 1, wherein each of the three or more Hall effect sensors is surrounded by a coil.

12. The mobile robot of claim 1, wherein the three or more Hall effect sensors are co-located on a circuit board, the circuit board having a footprint area between 15 and 30 square centimeters.

13. The mobile robot of claim 1, wherein the three or more Hall effect sensors are co-located on a circuit board and a ratio of an area of the circuit board to an area of the shell is between 150:1 and 300:1.

14. The mobile robot of claim 1, further comprising a charge pump and a capacitor, wherein the charge pump and the capacitor are electrically connected to at least one motor of the mobile robot.

15. The mobile robot of claim 14, wherein the at least one motor of the mobile robot can only operate when the capacitor is charged.

16. The mobile robot of claim 15, wherein the capacitor cannot be charged unless one or more of the three or more Hall effect sensors is covered by the magnet.

17. A method of detecting contact between a mobile robot and an obstacle, the method comprising:

sensing, with a sensor assembly comprising a magnet disposed on a shell of the mobile robot and three or more Hall effect sensors disposed on a chassis of the mobile robot, contact between an obstacle and the shell, wherein the three or more Hall effect sensors are covered by the magnet absent the contact between the obstacle and the shell, and at least one of the three or more Hall effect sensors is uncovered by the magnet in response to the contact between the obstacle and the shell;

determining, by a controller based on sensing the contact between the obstacle and the shell, a distance and a direction of movement of the shell relative to the chassis; and modifying at least one behavior of the mobile robot based on the distance and direction of movement of the shell relative to the chassis.

18. The method of claim 17 wherein determining the distance and the direction of movement of the shell relative to the chassis comprises determining from which of at least eight differing states of contact with the shell the contact occurred.

19. The method of claim 17, wherein determining the distance and the direction of movement of the shell relative to the chassis comprises determining an angle at which the mobile robot contacted an obstacle.

20. The method of claim 17, wherein determining the distance and the direction of movement of the shell relative to the chassis comprises using a look-up table.

21. The method of claim 17, further comprising reducing power to a motor of the mobile robot if none of the Hall effect sensors sense the magnet.

22. The method of claim 17, further comprising:

sending an electrical current through a coil surrounding a Hall effect sensor of the sensor assembly and determining, by the controller, whether the sensor assembly is functioning properly.

23. The method of claim 17, wherein modifying the behavior of the mobile robot comprises:

identifying and providing an instruction to a drive system of the mobile robot based on the distance and the direction of movement of the shell relative to the chassis.

24. The method of claim 23, wherein the instruction comprises a command to execute an obstacle avoidance maneuver.

25. The method of claim 24, wherein the obstacle avoidance maneuver comprises a command for the mobile robot to back up a computed distance from the obstacle.

26. The method of claim 23, wherein identifying and providing an instruction for a drive system of the mobile robot comprises using machine learning.

* * * * *